United States Patent
Chen et al.

(10) Patent No.: US 9,851,545 B2
(45) Date of Patent: Dec. 26, 2017

(54) METHOD FOR NON-FLUORESCENCE HIGHER HARMONIC GENERATION GROUND STATE DEPLETION SUPER-RESOLUTION MICROSCOPY

(71) Applicant: National Central University, Taoyuan (TW)

(72) Inventors: Szu-Yu Chen, Taoyuan (TW); Jui-Fen Chang, Taoyuan (TW); Chao-Yi Tai, Taoyuan (TW); Hao-Hao Wu, Taoyuan (TW)

(73) Assignee: NATIONAL CENTRAL UNIVERSITY, Taoyuan (TW)

( * ) Notice: Subject to any disclaimer, the term of this patent is extended or adjusted under 35 U.S.C. 154(b) by 280 days.

(21) Appl. No.: 14/847,538

(22) Filed: Sep. 8, 2015

(65) Prior Publication Data

US 2017/0017068 A1  Jan. 19, 2017

(30) Foreign Application Priority Data

Jul. 16, 2015  (TW) .............................. 104123137 A

(51) Int. Cl.
*G02B 21/16* (2006.01)
*G02B 21/00* (2006.01)
*G02F 1/35* (2006.01)
*G02B 21/36* (2006.01)

(52) U.S. Cl.
CPC ...... *G02B 21/0072* (2013.01); *G02B 21/0032* (2013.01); *G02B 21/0084* (2013.01); *G02B 21/16* (2013.01); *G02B 21/365* (2013.01); *G02F 1/353* (2013.01)

(58) Field of Classification Search
CPC .. G02B 21/0072; G02B 21/365; G02B 21/16; G02B 21/0032; G02B 21/0084; G02F 1/353
See application file for complete search history.

(56) References Cited

U.S. PATENT DOCUMENTS

2017/0038300 A1* 2/2017 Dake ...................... G02B 21/06
2017/0176338 A1* 6/2017 Wu ..................... G01N 21/6458

* cited by examiner

*Primary Examiner* — Tony Ko
(74) *Attorney, Agent, or Firm* — Juan Carlos A Marquez; Marquez IP Law Office, PLLC

(57) ABSTRACT

The present invention discloses a method for non-fluorescence higher harmonic generation ground state depletion super-resolution microscopy, it includes the following steps: providing an organic material unit, focusing excitation light and ground state depletion light, generating a higher harmonic signal, performing ground state depletion and performing microscopic imaging. With the implementation of the present invention, the stimulated electrons of the organic material remains majorly on the singlet (S1) state or the triplet (T1) state, instead of the ground (S0) state, to provide modulation of the spatial distribution of the non-fluorescence signal, and make STED microscopy applicable to non-fluorescence signals to promote the resolution of the images.

11 Claims, 5 Drawing Sheets

METHOD FOR NON-FLUORESCENCE HIGHER HARMONIC GENERATION GROUND STATE DEPLETION SUPER-RESOLUTION MICROSCOPY

BACKGROUND OF THE INVENTION

1. Technical Field

The present invention relates to a method for super-resolution microscopy and, more particularly, to a method for non-fluorescence higher harmonic generation ground state depletion super-resolution microscopy.

2. Description of Related Art

The recently developed high-resolution STED (stimulated emission depletion) microscopes and STED microscopy have overcome the 200-nm upper limit of resolution imposed by diffraction on the conventional fluorescence microscopes. Using the innovative point-spread function technique, STED microscopes have a resolution more than ten times as high as that of their traditional counterparts and can therefore provide much finer microscopic images.

One major limitation on the application of STED microscopy, however, is that the STED technique can only be used to modulate, and form microscopic images with, fluorescence signals. The conventional STED ultra-resolution microscopy is used mainly in fluorescence-related applications and achieves ultra-high resolution by modulating fluorescence intensity with STED; it does not work or cannot offer any help when it is desired to modulate, or form microscopic images with, non-fluorescence signals.

In view of this, it has been a common goal of development and innovation in the fields of cell analysis, spatial domain analysis, and microscopy to extend the currently limited use of STED ultra-resolution microscopy in modulating fluorescence signals alone, and to create a useful and easy-to-implement method for non-fluorescence STED microscopy that features fast and accurate detection, stable imaging, and high spatial domain resolution, thereby expanding the application of STED to the modulation and detection of non-fluorescence signals.

BRIEF SUMMARY OF THE INVENTION

The present invention provides a method for non-fluorescence higher harmonic generation ground state depletion ultra-resolution microscopy, and the method includes the steps of: providing an organic material unit, focusing excitation light and ground state depletion light, generating a higher harmonic signal, performing ground state depletion, and performing microscopic imaging. The present invention expands the application of STED ultra-resolution microscopy to modulating, and forming microscopic images with, non-fluorescence signals and increases the image resolution of microscopic imaging.

More particularly, the present invention provides a method for non-fluorescence higher harmonic generation ground state depletion ultra-resolution microscopy, and the method includes the steps of: providing an organic material unit, wherein the organic material unit includes a plurality of molecules, each of the molecules has a plurality of electrons, and each of the electrons has an energy band with energy of hv such that, when excited by hv, the electrons jump from the ground state to the singlet state and undergo inter-system crossing from the singlet state to the triplet state, with h being the Planck constant ($6.626 \times 10^{-34}$) and v being a frequency expressed in the unit of hertz (Hz); focusing excitation light and ground state depletion light by collimating excitation light projected by a long-wavelength ultrafast pulse laser and ground state depletion light projected by a short-wavelength continuous-wave laser, combining the collimated excitation light with the collimated ground state depletion light, and focusing the combined light onto a plurality of test positions of the organic material unit sequentially; generating a higher harmonic signal by irradiating and exciting the test positions of the organic material unit with the focused excitation light such that the electrons of the molecules at the test positions are excited and jump to the singlet state and the molecules induce the higher harmonic generation signal; performing ground state depletion by irradiating with the focused ground state depletion light, and thus depleting, the electrons at the test positions that are in the ground state such that the electrons are excited and jump to the singlet state and undergo inter-system crossing to the triplet state; and performing microscopic imaging by receiving the higher harmonic generation signal of the test positions of the organic material unit and generating an ultra-resolution microscopic image corresponding to the organic material unit, with a STED system.

Implementation of the present invention at least provides the following advantageous effects:

1. The application of STED microscopy is expanded to modulating, and forming microscopic images with, non-fluorescence signals.

2. With ground state depletion, non-linear absorption is reduced, and higher harmonic generation signals are suppressed in strength to facilitate the modulation of spatial distribution of such signals.

3. The method of the present invention can be directly applied to cell analysis and microscopic imaging and is useful, easy to implement, fast and accurate in detection, and stable in terms of imaging.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE SEVERAL VIEWS OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
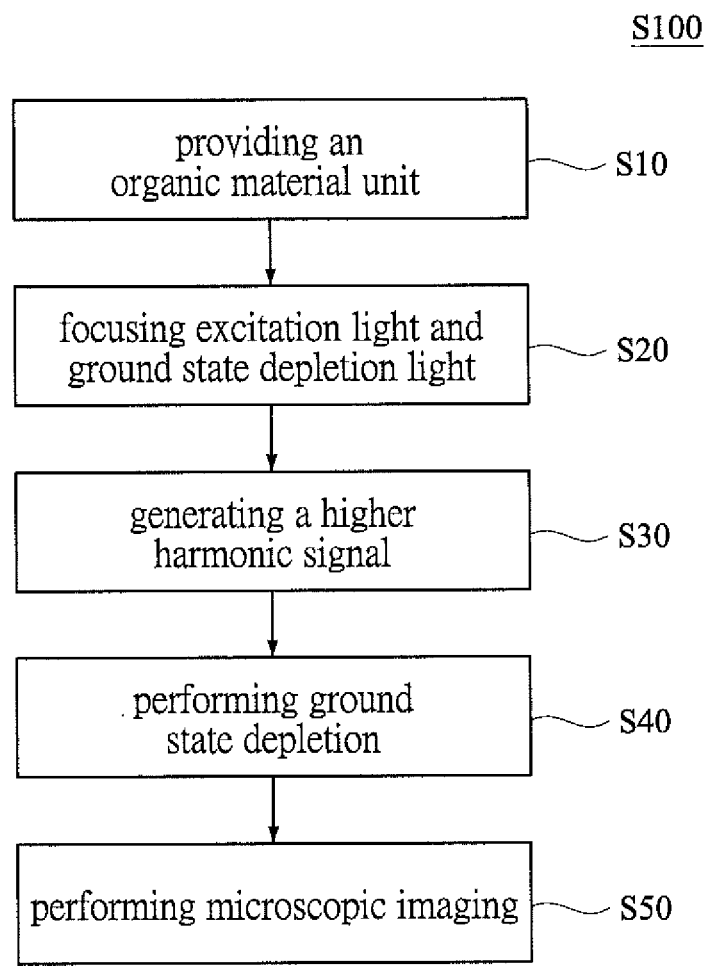
FIG. 1 is the flowchart of the method in an embodiment of the present invention for non-fluorescence higher harmonic generation ground state depletion super-resolution microscopy.

Referring to FIG. 1, the method S100 in an embodiment of the present invention for non-fluorescence higher harmonic generation ground state depletion super-resolution microscopy includes the steps of: providing an organic material unit (step S10), focusing excitation light and ground state depletion light (step S20), generating a higher harmonic signal (step S30), performing ground state depletion (step S40), and performing microscopic imaging (step S50).

Figure 2:
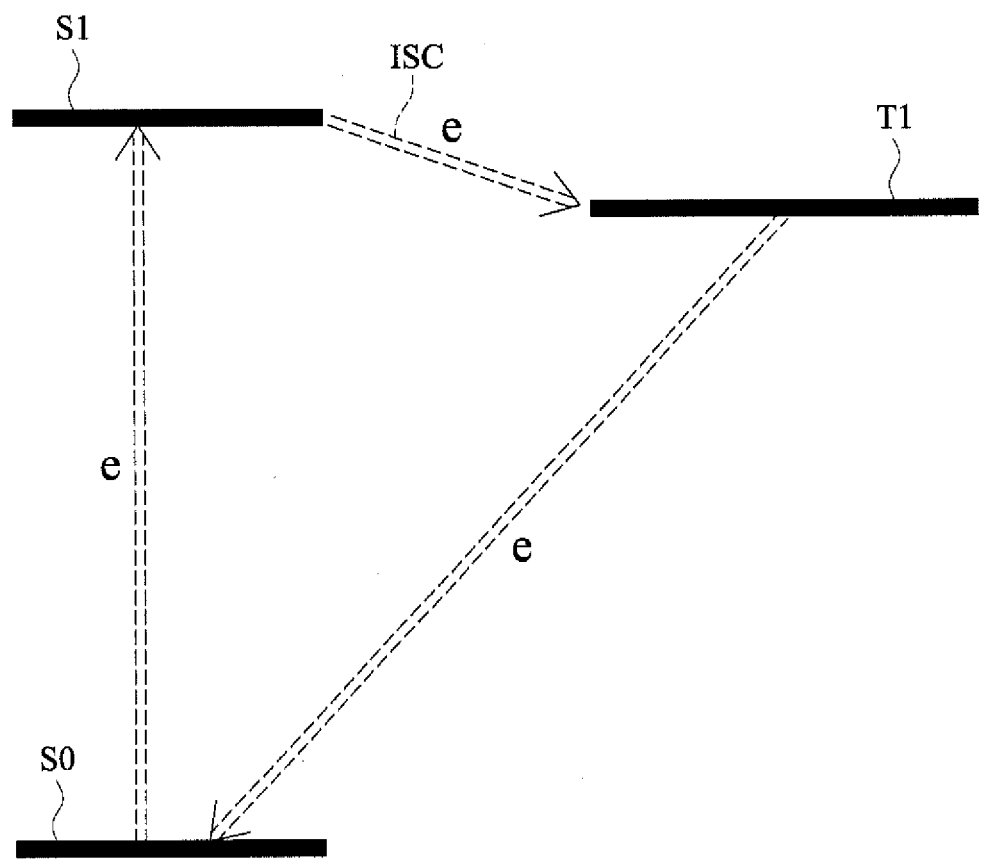
FIG. 2 schematically shows how an electron changes through the ground state, the singlet state, and the triplet state.

Referring to FIG. 1 and FIG. 2, the step S10 of providing an organic material unit uses an organic material unit 10 which includes a plurality of molecules each having a plurality of electrons e. Each electron e has an energy band with energy of hv, wherein h is the Planck constant ($6.626 \times 10^{-34}$) and v is a frequency expressed in the unit of hertz (Hz). When excited by energy of hv, the electrons e jump from the ground state S0 to the singlet state S1.

As shown in FIG. 2, once the electrons e in the ground state S0 are excited and jump to the singlet state S1, some of the electrons e in the singlet state S1 are transferred from the singlet state S1 to the triplet state T1 through inter-system crossing (ISC).

More specifically, some of the electrons e in the singlet state S1 undergo inter-system crossing from the singlet state S1 to the triplet state T1 due to the fact that the orbitals in which the electrons e revolve about the atom's nucleus overlap, or that the spin directions of the electrons e are non-conservative or unstable. There is significant inter-system crossing in the organic material unit 10.

Figure 3:
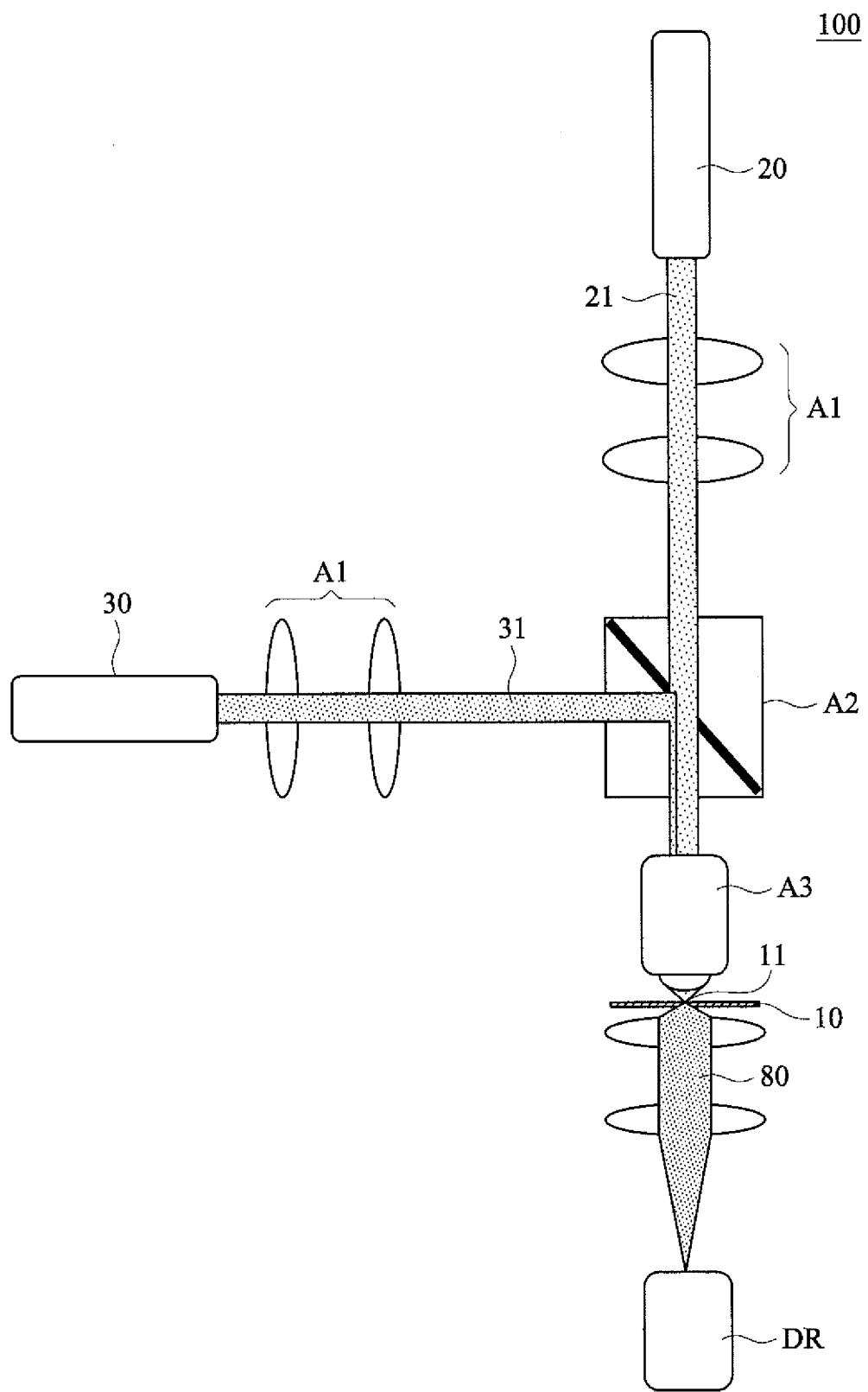
FIG. 3 is a schematic diagram of the optical system in an embodiment of the present invention.

Referring to FIG. 1 and FIG. 3, the method S100 for non-fluorescence higher harmonic generation ground state depletion ultra-resolution microscopy can be carried out via an optical system 100. The optical system 100 may include a long-wavelength ultrafast pulse laser 20, a short-wavelength continuous-wave laser 30, two laser collimation units A1, a light combining unit A2, an objective lens A3, and a photodetector DR.

The step S20 of focusing excitation light and ground state depletion light is now described with reference to FIG. 1 and FIG. 3. To begin with, the laser collimation units A1 respectively collimate the excitation light 21 projected by the long-wavelength ultrafast pulse laser 20 and the ground state depletion light 31 projected by the short-wavelength continuous-wave laser 30. Then, the collimated excitation light 21 and the collimated ground state depletion light 31 are combined by the light combining unit A2, in order for the objective lens A3 to focus the combined excitation light 21 and ground state depletion light 31 onto a plurality of test positions 11 of the organic material unit 10 sequentially. The test positions 11 are located on the surface of the organic material unit 10 that is irradiated by the focused excitation light 21 and the focused ground state depletion light 31.

The term "ultrafast pulse" means that the pulse width of the long-wavelength ultrafast pulse laser 20 is selected to be less than 1 picosecond.

Referring to FIG. 1, FIG. 3, FIG. 4A, and FIG. 4B, the step S30 of generating a higher harmonic signal involves irradiating the test positions 11 of the organic material unit 10 with the focused excitation light 21. As a result, the electrons e of the molecules at the test positions 11 are excited and jump from the ground state S0 to the singlet state S1, and the molecules induce a higher harmonic generation signal whose frequency is a multiple of v.

Figure 4A:
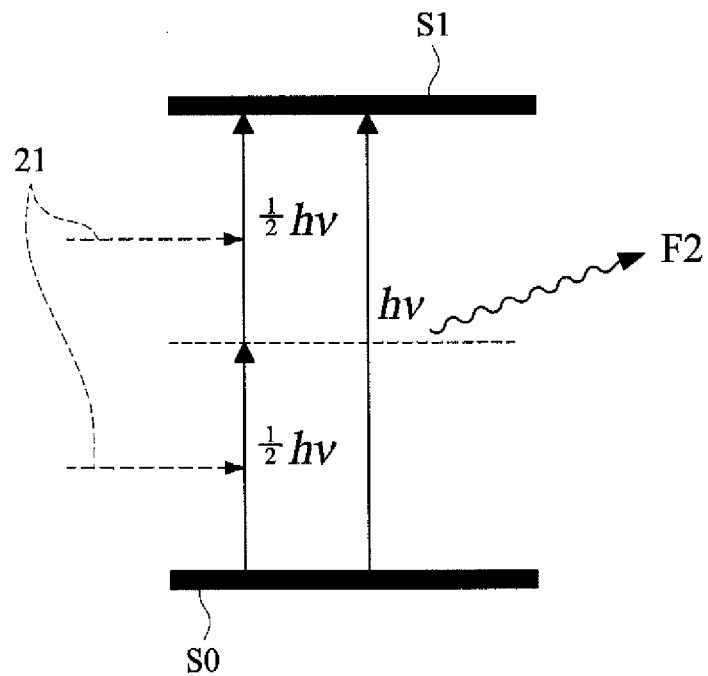
FIG. 4A schematically shows how a second harmonic generation signal is generated in an embodiment of the present invention.

Referring to FIG. 1, FIG. 3, and FIG. 4A, if the wavelength of the excitation light 21 emitted by the long-wavelength ultrafast pulse laser 20 is selected to be twice as long as the wavelength corresponding to the frequency v, the sum of the energy of a biphoton (two photons) of the excitation light 21 will be hv, which is sufficient to excite the electrons e at the test positions 11 from the ground state S0 to the singlet state S1 and cause the molecules of the organic material unit 10 to induce a second harmonic generation signal F2 whose frequency is twice that of the excitation light 21.

Figure 4B:
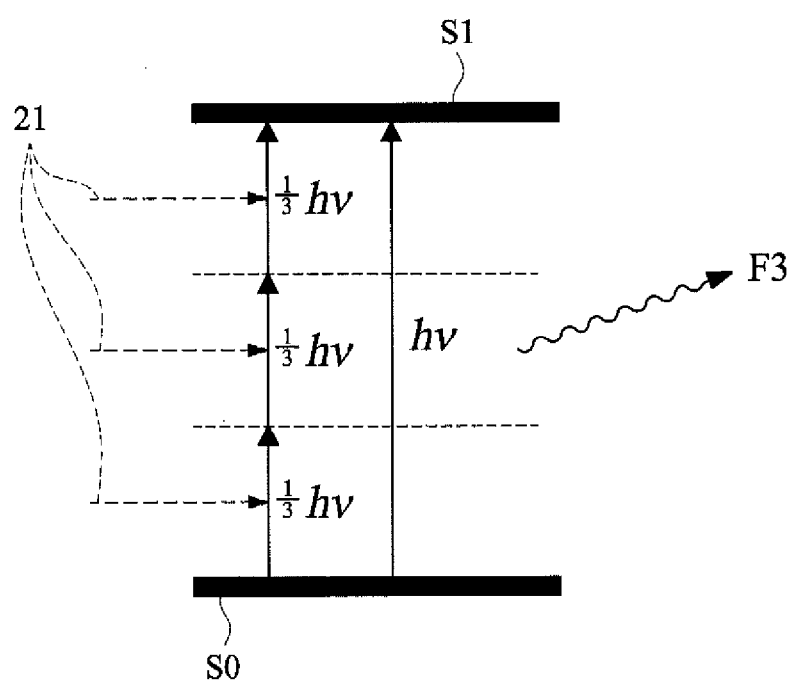
FIG. 4B schematically shows how a third harmonic generation signal is generated in an embodiment of the present invention.

Referring to FIG. 1, FIG. 3, and FIG. 4B, if the wavelength of the excitation light 21 emitted by the long-wavelength ultrafast pulse laser 20 is selected to be three times as long as the wavelength corresponding to the frequency v, the sum of the energy of a triphoton (three photons) of the excitation light 21 will be hv, which is sufficient to excite the electrons e at the test positions 11 from the ground state S0 to the singlet state S1 and cause the molecules of the organic material unit 10 to induce a third harmonic generation signal F3 whose frequency is three times that of the excitation light 21.

In the following step S40 of performing ground state depletion, referring to FIG. 1 to FIG. 3, the focused ground state depletion light 31 of the short-wavelength continuous-wave laser 30 is projected to the electrons e at the test positions 11 that are in the ground state S0, with a view to depleting the electrons e. The electrons e will be excited and jump to the singlet state S1, and some of the electrons e will undergo inter-system crossing to the triplet state T1.

According to physics, the time it takes for an electron e in the triplet state T1 to return to the ground state S0 (i.e., the lifetime of the electron) is much longer than the time it takes for an electron e in the singlet state S1 to return to the ground state S0 (i.e., the lifetime of the electron). Moreover, as previously mentioned, there is significant inter-system crossing in the organic material unit 10.

Therefore, irradiating the organic material unit 10 with the focused ground state depleting light 31 will cause the irradiated electrons e to stay in the triplet state T1 most of the time such that ground state depletion (GSD) is achieved.

When the organic material unit 10 undergoes ground state depletion, the depletion of ground-state electrons e reduces non-linear absorption of the organic material unit 10, thus allowing modulation of strength of the higher harmonic generation signal induced by the organic material unit 10.

Herein, the term "short wavelength" means that the wavelength of the short-wavelength continuous-wave laser 30 is selected to be a wavelength corresponding to the frequency v.

To carry out the step S50 of performing microscopic imaging, referring back to FIG. 1 to FIG. 3, the higher harmonic generation signal induced by the molecules at the test positions 11 of the organic material unit 10 is received by the photodetector DR in order for a microscopic imaging device of the STED system to generate an ultra-resolution microscopic image corresponding to the organic material unit 10.

Modulation of the higher harmonic generation signal helps enhance the resolution of the image of the organic material unit 10 obtained from the step S50 of performing microscopic imaging, and this contributes to expanding the applicability of STED microscopy substantially.

Figure 5:
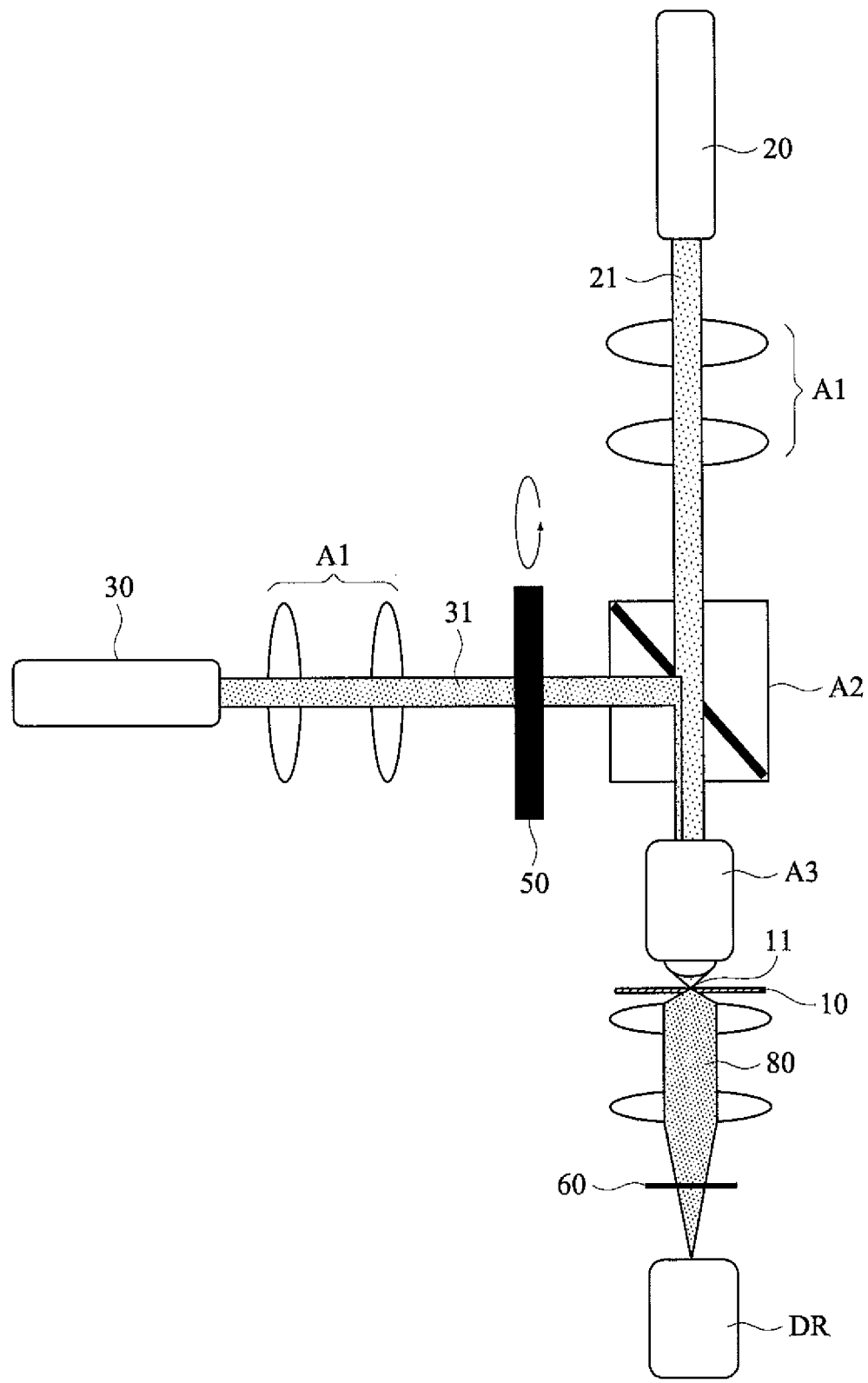
FIG. 5 is a schematic diagram of the optical system in another embodiment of the present invention.

Referring to FIG. 5, the optical system 100 implementing the method S100 for non-fluorescence higher harmonic generation ground state depletion ultra-resolution microscopy may further include a spiral phase plate 50 provided between the short-wavelength continuous-wave laser 30 and the light combining unit A2.

Once the collimated ground state depletion light 31 passes through the spiral phase plate 50, the center of the light is twisted like eccentric spirals that meet in opposite directions every 180 degrees. When subsequently focused by the objective lens A3, the spirals at the center of the ground state depletion light 31 cancel each other due to their difference in phase, forming an annular distribution of light.

On the other hand, referring to FIG. 3 or FIG. 5, the light combining unit A2 can be a dichroic mirror for combining the collimated excitation light and the collimated ground state depletion light. The selection of the dichroic mirror is based mainly on the mirror's permeability to the excitation light. The higher the permeability to the excitation light is, the better the microscopic imaging result will be.

As shown in FIG. 5, the excitation light 21, the ground state depletion light 31, and the signal light 80 in the optical system 100 lie on the same optical axis (optical path). Hence, a band pass filter 60 can be provided upstream of the photodetector DR, which serves to receive the signal light 80. The band pass filter 60 will filter out the excitation light 21 and the ground state depletion light 31 so that the photodetector DR receives only the higher harmonic generation signal.

Since higher harmonic generation signals are difficult to obtain, the photodetector DR in the optical system 100 can be a photomultiplier tube (PMT) for receiving the signal light 80, converting the received signal light 80 into an electrical signal, and then increasing the strength of the electrical signal with an amplifier to facilitate subsequent imaging.

The embodiments described above are intended only to demonstrate the technical concept and features of the present invention so as to enable a person skilled in the art to understand and implement the contents disclosed herein. It is understood that the disclosed embodiments are not to limit the scope of the present invention. Therefore, all equivalent changes or modifications based on the concept of the present invention should be encompassed by the appended claims.

What is claimed is:

1. A method for non-fluorescence higher harmonic generation ground state depletion ultra-resolution microscopy, comprising the steps of:

providing an organic material unit, wherein the organic material unit comprises a plurality of molecules, each said molecule has a plurality of electrons, and each said electron has an energy band with energy of hv such that, when excited by hv, the electrons jump from a ground state to a singlet state and undergo inter-system crossing from the singlet state to a triplet state, with h being the Planck constant (equal to $6.626 \times 10^{-34}$) and v being a frequency expressed in hertz (Hz);

focusing excitation light and ground state depletion light by collimating the excitation light, projected by a long-wavelength ultrafast pulse laser, and the ground state depletion light, projected by a short-wavelength continuous-wave laser; combining the collimated excitation light with the collimated ground state depletion light; and focusing the combined light onto a plurality of test positions of the organic material unit sequentially;

generating a higher harmonic signal by irradiating and exciting the test positions of the organic material unit with the focused excitation light such that the electrons of the molecules at the test positions are excited and jump to the singlet state and the molecules induce the higher harmonic generation signal;

performing ground state depletion by irradiating with the focused ground state depletion light, and thus depleting, the electrons at the test positions that are in the ground state such that the electrons are excited and jump to the singlet state and undergo inter-system crossing to the triplet state; and performing microscopic imaging by receiving the higher harmonic generation signal of the test positions of the organic material unit and generating an ultra-resolution microscopic image corresponding to the organic material unit, with a stimulated emission depletion (STED) system.

2. The method of claim 1, wherein the electrons in the singlet state have overlapping orbitals or non-conservative spin directions and undergo inter-system crossing.

3. The method of claim 1, wherein the test positions are located on a surface of the organic material unit that is irradiated by the focused excitation light and the focused ground state depletion light.

4. The method of claim 1, wherein the electrons of the molecules have a longer lifetime from the triplet state to the ground state than from the singlet state to the ground state.

5. The method of claim 1, wherein the long-wavelength ultrafast pulse laser projects a plurality of photons, and a sum of energy of each two said photons is equal to hv.

6. The method of claim 5, wherein the long-wavelength ultrafast pulse laser has a pulse width less than 1 picosecond and a wavelength twice as long as a wavelength corresponding to the frequency v.

7. The method of claim 1, wherein the long-wavelength ultrafast pulse laser projects a plurality of photons, and a sum of energy of each three said photons is equal to hv.

8. The method of claim 7, wherein the long-wavelength ultrafast pulse laser has a pulse repetition rate higher than 1/μm (i.e., more than one pulse is generated per microsecond) and a wavelength three times as long as a wavelength corresponding to the frequency v.

9. The method of claim 1, wherein the short-wavelength continuous-wave laser projects a plurality of photons, and energy of each said photon is equal to hv.

10. The method of claim 1, wherein the short-wavelength continuous-wave laser has a wavelength equal to a wavelength corresponding to the frequency v.

11. The method of claim 9, wherein the short-wavelength continuous-wave laser has a wavelength equal to a wavelength corresponding to the frequency v.

* * * * *